United States Patent
Shih

(10) Patent No.: US 8,132,947 B2
(45) Date of Patent: Mar. 13, 2012

(54) VEHICLE HEAD LIGHT DEVICE

(76) Inventor: Jen Shieh Shih, Changhua (TW)

( * ) Notice: Subject to any disclaimer, the term of this patent is extended or adjusted under 35 U.S.C. 154(b) by 327 days.

(21) Appl. No.: 12/583,879

(22) Filed: Aug. 27, 2009

(65) Prior Publication Data

US 2011/0051452 A1    Mar. 3, 2011

(51) Int. Cl.
  *F21V 7/00* (2006.01)
  *F21V 21/00* (2006.01)
  *F21S 8/10* (2006.01)
  *B60Q 1/00* (2006.01)

(52) U.S. Cl. .................. 362/547; 362/516; 362/545

(58) Field of Classification Search .............. 362/475, 362/506, 507, 538, 543, 544, 547, 249.02, 362/235, 236, 237, 240, 241, 242, 243, 247, 362/546
See application file for complete search history.

(56) References Cited

U.S. PATENT DOCUMENTS

| | | | | |
|---|---|---|---|---|
| 1,465,549 A | * | 8/1923 | Gilchrist | 362/546 |
| 4,635,173 A | * | 1/1987 | Dressler et al. | 362/294 |
| 6,497,507 B1 | * | 12/2002 | Weber | 362/547 |
| 6,650,058 B1 | | 11/2003 | Wang | |
| 6,976,775 B2 | * | 12/2005 | Koike | 362/545 |
| 7,156,544 B2 | * | 1/2007 | Ishida | 362/538 |
| 7,306,352 B2 | * | 12/2007 | Sokolov et al. | 362/341 |
| 7,329,033 B2 | * | 2/2008 | Glovatsky et al. | 362/547 |
| 7,370,996 B2 | | 5/2008 | Ohshio | |
| 7,703,959 B2 | * | 4/2010 | Nakada et al. | 362/507 |
| 7,794,126 B2 | * | 9/2010 | Ishida et al. | 362/516 |
| 2009/0097247 A1 | * | 4/2009 | Tseng et al. | 362/241 |

FOREIGN PATENT DOCUMENTS

JP    2007059075 A  *  3/2007

\* cited by examiner

Primary Examiner — David Crowe
(74) Attorney, Agent, or Firm — Charles E. Baxley

(57) ABSTRACT

A vehicle head light device includes an inner housing attached to front of an outer housing and having an upper casing and a lower casing located within the outer housing, and the casings each include a reflective member, two circuit boards are attached to the casings and each include one or more light members directed toward the reflective members for generating lights toward the reflective members which reflect the lights to form a high beam and a low beam respectively, a control device is disposed in the outer housing and electrically coupled to the circuit boards for controlling the light member to generate the lights toward the reflective members of the casings respectively.

11 Claims, 3 Drawing Sheets

VEHICLE HEAD LIGHT DEVICE

BACKGROUND OF THE INVENTION

1. Field of the Invention

The present invention relates to a vehicle head light device, and more particularly to a vehicle head light device including a simplified structure for allowing the vehicle head light device to be easily and quickly manufactured and assembled and for allowing the manufacturing fee or cost of the vehicle head light device to be suitably reduced.

2. Description of the Prior Art

Typical vehicle head light devices comprise a central light bulb disposed in a light housing, and one or more reflective or refracting members for reflecting the light.

For example, U.S. Pat. No. 6,650,058 to Wang discloses one of the typical vehicle head lights comprising an inner housing and an outer housing, a light passage channel formed and located between the inner and the outer housings, a central light bulb disposed in the inner housing, and two auxiliary light bulbs disposed in the outer housing, and a complicated electrical control circuit coupled to the light bulbs for controlling the light beam of the typical vehicle head lights.

However, the typical vehicle head lights comprise a complicated structure that may not be easily and quickly manufactured and assembled and the manufacturing fee or cost of the vehicle head light device will be greatly increased.

U.S. Pat. No. 7,370,996 to Ohshio discloses another typical vehicle headlamp comprising a projector lens, a light source bulb, a reflector for reflecting direct light from the light source bulb, a movable shade, and an actuator for moving the movable shade around a rotary axis and between a shading position and a shading relieving position.

However, the typical vehicle headlamp also comprises a complicated structure that requires an actuator for moving the movable shade around a rotary axis and that also may not be easily and quickly manufactured and assembled and that the manufacturing fee or cost of the vehicle head lamp device will be greatly increased.

The present invention has arisen to mitigate and/or obviate the afore-described disadvantages of the conventional vehicle head light devices.

SUMMARY OF THE INVENTION

The primary objective of the present invention is to provide a vehicle head light device including a simplified structure for allowing the vehicle head light device to be easily and quickly manufactured and assembled and for allowing the manufacturing fee or cost of the vehicle head light device to be suitably reduced.

In accordance with one aspect of the invention, there is provided a vehicle head light device comprising an outer housing including a chamber formed therein, an inner housing attached to the outer housing and including an upper casing and a lower casing located within the chamber of the outer housing, and the upper and the lower casings each including a compartment formed therein and opened forwardly, and each including a reflective member provided therein, two circuit boards attached to the upper and the lower casings respectively and each including at least one light member directed toward the reflective members of the upper and the lower casings respectively for generating lights toward the reflective members of the upper and the lower casings respectively which reflect the lights to form a high beam and a low beam respectively, a hood attached to front of the inner housing and the outer housing, and a control device disposed within the chamber of the outer housing and electrically coupled to the circuit boards for controlling the light member to generate the lights toward the reflective members of the upper and the lower casings respectively.

The upper casing includes an upper wall having at least one hole formed therein for receiving the light member, and the lower casing includes a lower wall having at least one hole formed therein for receiving the light member. The upper and the lower walls of the upper and the lower casings each include a serrated inner surface formed therein.

The inner housing includes at least one passage formed therein for allowing air to flow into and out of the outer housing. The outer housing includes at least one air perforation formed therein for air circulating purposes, and the passage of the inner housing is located in front of the air perforation of the outer housing.

The hood includes at least one opening formed therein and aligned with the passage of the inner housing for allowing the air to flow through the opening of the hood and the passage of the inner housing and to flow into of the outer housing. The hood includes a filter net engaged in the opening of the hood.

Two heat dissipating devices may further be provided and attached to the upper and the lower casings respectively for anchoring and positioning the circuit boards between the heat dissipating devices and the upper and the lower casings respectively.

The heat dissipating devices each include a depression formed therein for receiving the circuit boards respectively. The heat dissipating devices each include a number of fins extended outwardly therefrom for heat dissipating purposes.

The outer housing includes a front outer peripheral flange extended radially and inwardly into the chamber of the outer housing, and the inner housing includes a front outer peripheral flange engaged with the outer peripheral flange of the outer housing for securing to the outer peripheral flange of the outer housing.

The hood includes an outer peripheral flange engaged with the outer peripheral flange of the inner housing for securing to the outer peripheral flange of the inner housing and the outer peripheral flange of the outer housing.

A frame may further be provided and engaged with the outer peripheral flange of the hood for securing the outer peripheral flange of the hood and the outer peripheral flange of the inner housing to the outer peripheral flange of the outer housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 3:
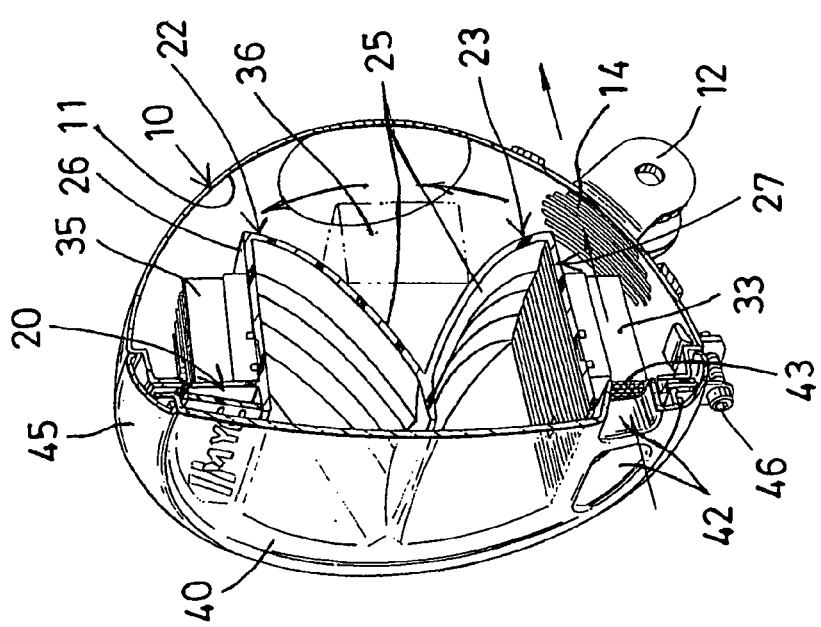
FIG. 3 is a front perspective view similar to FIG. 2, in which a portion of the vehicle head light device has been cut off for showing the inner structure of the vehicle head light device.
Figure 4:
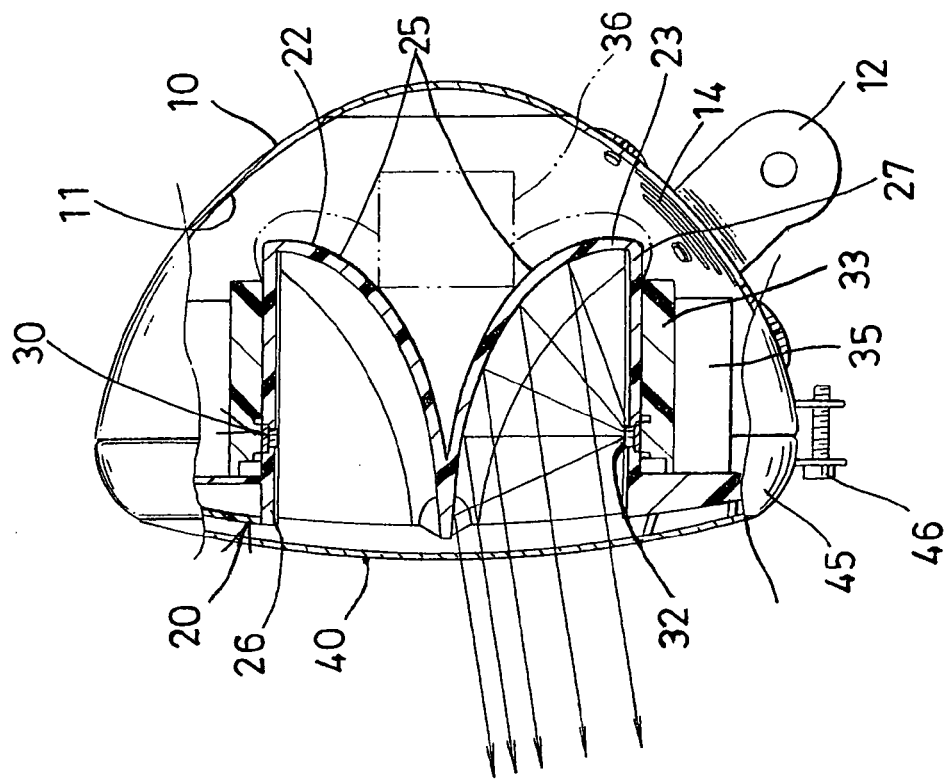
FIG. 4 is a cross sectional view of the vehicle head light device taken along lines 4-4 of FIG. 2.
Figure 5:
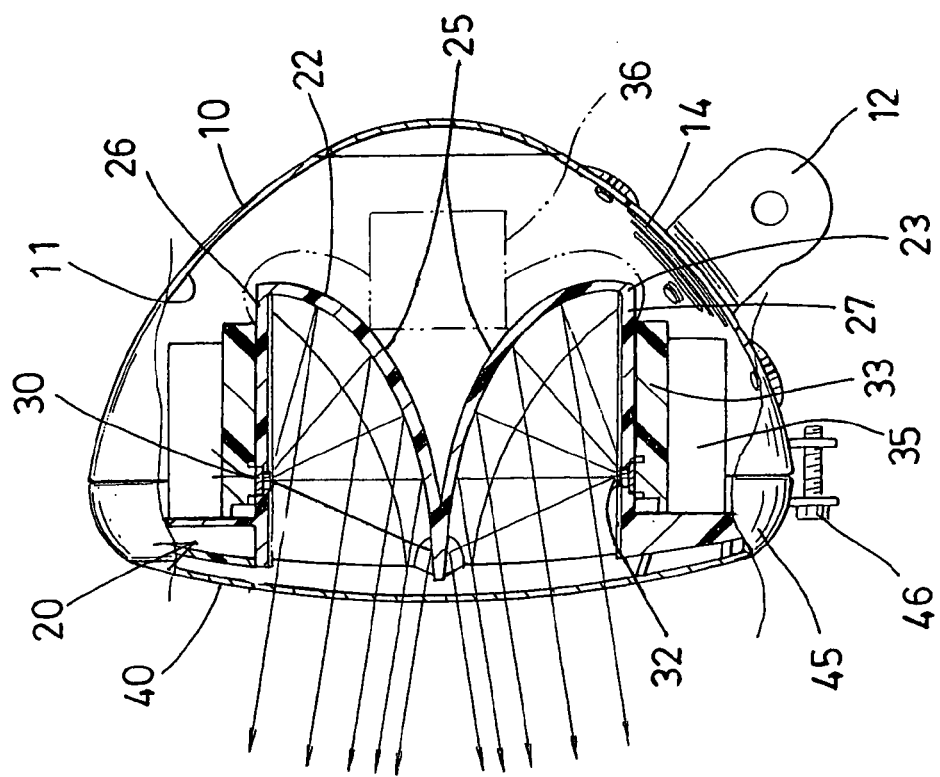
FIG. 5 is a cross sectional view similar to FIG. 4, illustrating the operation of the vehicle head light device.

Referring to the drawings, and initially to FIGS. 1-4, a vehicle head light device in accordance with the present invention comprises an outer housing 10 including a dome-shape having a chamber 11 formed therein, and including one or more ears 12 extended outwardly therefrom for attaching or mounting or securing to the front portion of a vehicle, for example, and including an outer peripheral flange 13 formed or provided in the front portion of the outer housing 10 and extended radially and inwardly into the chamber 11 thereof, and including a number of air perforations 14 formed therein, such as formed in the rear and/or lower portion of the outer housing 10, best shown in FIGS. 3-5, for allowing the air to flow into or out of the outer housing 10.

An inner housing 20 is disposed in the chamber 11 of the outer housing 10 and/or attached to the front portion of the outer housing 10, and includes an outer peripheral flange 21 formed or provided in the front portion of the inner housing 20 for engaging with the outer peripheral flange 13 of the outer housing 10 and for securing to the outer peripheral flange 13 of the outer housing 10 with latches or fasteners 15 (FIG. 1), and includes two casings 22, 23 formed or provided therein and disposed and located within the chamber 11 of the outer housing 10, and the casings 22, 23 each include a compartment 24 formed therein and opened forwardly, and each include a reflective or refracting surface or member 25 provided therein for reflecting the light.

For example, the reflective member 25 of the upper casing 22 is faced or curved upwardly for reflecting the light to form a high beam (FIG. 5), and the reflective member 25 of the lower casing 23 is faced or curved downwardly for reflecting the light to form a low beam (FIGS. 4, 5), the upper casing 22 includes an upper plate or wall 26 and the lower casing 23 includes a lower plate or wall 27, and the walls 26, 27 of the casings 22, 23 each include one or more holes 28 formed therein (FIG. 1) and each include a serrated or toothed inner surface 29 formed therein. It is preferable that the plates or walls 26, 27 of the casings 22, 23 are flat or each include a planar structure having the serrated or toothed inner surface 29 faced toward the compartments 24 of the casings 22, 23 respectively.

Two circuit boards 30 are attached or mounted or secured to the outer portion of the walls 26, 27 of the casings 22, 23 respectively with latches or fasteners 31 (FIG. 1), and each include one or more light emitting diodes or light bulbs or light members 32 disposed thereon and engaged with or through the holes 28 of the walls 26, 27 of the casings 22, 23 and faced or directed toward the reflective members 25 of the casings 22, 23 respectively for generating lights toward the reflective members 25 of the casings 22, 23 respectively which may reflect the lights to form the high beam or the low beam (FIGS. 4, 5). One or more (such as two) heat dissipating devices 33 are attached or mounted or secured to the outer portion of the walls 26, 27 of the casings 22, 23 respectively also with latches or fasteners 31.

The heat dissipating devices 33 each include a depression 34 formed therein for receiving the circuit boards 30 respectively and for stably anchoring and positioning the circuit boards 30 between the heat dissipating devices 33 and the walls 26, 27 of the casings 22, 23 respectively, and each include a number of fins 35 extended outwardly therefrom for heat dissipating purposes. A processor or control device 36 may further be provided and disposed within the chamber 11 of the outer housing 10 and electrically coupled to the circuit boards 30 respectively for controlling the light members 32 to selectively generate the lights toward the reflective members 25 of the casings 22, 23 respectively. The inner housing 20 includes one or more (such as two) passages 38 formed therein, such as formed in the lower portion thereof, and preferably located in front of the air perforations 14 of the outer housing 10.

A cover or hood 40 is disposed or attached or mounted or secured to the front portion of the inner housing 20 and the outer housing 10, and includes an outer peripheral flange 41 for engaging with the outer peripheral flange 21 of the inner housing 20 and/or the outer peripheral flange 13 of the outer housing 10 and for securing to the outer peripheral flange 21 of the inner housing 20 and the outer peripheral flange 13 of the outer housing 10 with the latches or fasteners 15, and includes one or more (such as two) openings 42 formed therein and aligned with the passages 38 of the inner housing 20 respectively for allowing the air to flow through the openings 42 of the hood 40 and the passages 38 of the inner housing 20 and then to flow into of the outer housing 10.

It is preferable that the hood 40 includes one or more (such as two) filter nets 43 engaged with or in the openings 42 of the hood 40 respectively for filtering the air and for preventing dirt or particles from flowing and entering into the outer housing 10. A peripheral frame 45 may further be provided and engaged with or disposed or attached or mounted or secured to the front portion of the hood 40 and engaged with the outer peripheral flange 41 of the hood 40 and/or the outer peripheral flange 21 of the inner housing 20 and/or the outer peripheral flange 13 of the outer housing 10 and secured to the outer housing 10 with latches or fasteners 46 for solidly and stably securing the hood 40 and inner housing 20 to the outer housing 10.

Figure 1:
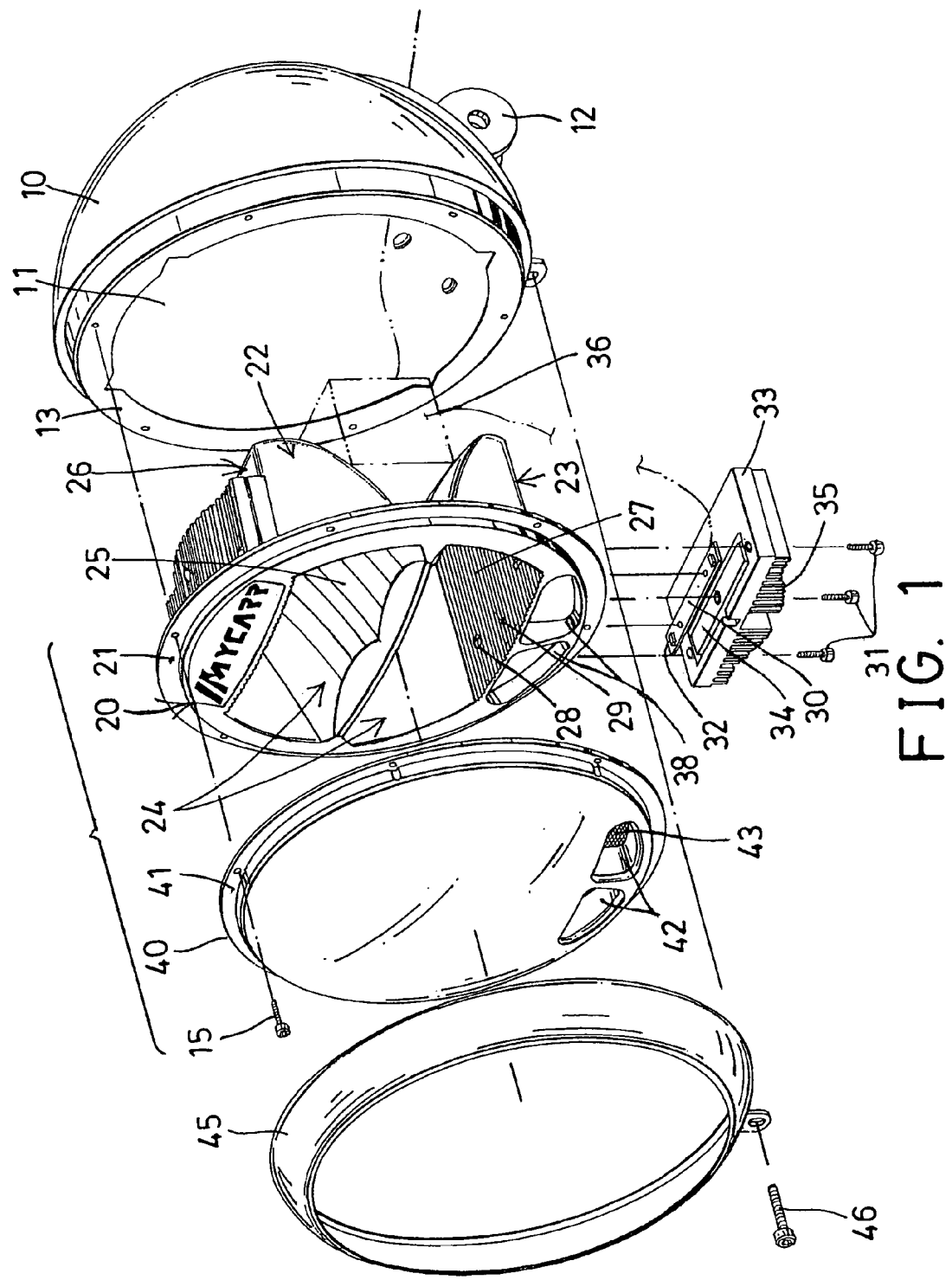
FIG. 1 is a partial exploded view of a vehicle head light device in accordance with the present invention.
Figure 2:
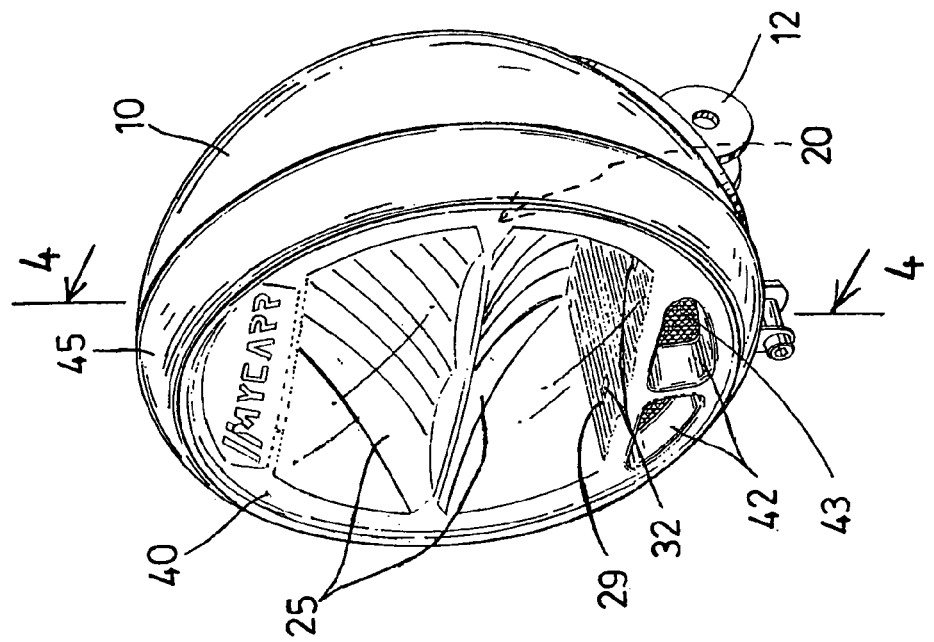
FIG. 2 is a front perspective view of the vehicle head light device.

In operation, as shown in FIGS. 4 and 5, the light members 32 of either or both of the circuit boards 30 may be selectively energized or actuated or operated to generate the lights toward the reflective members 25 of the casings 22, 23 respectively and to selectively form the high beam or the low beam. It is to be noted that the high beam or the low beam may be generated or formed separately with the light members 32 of the circuit boards 30 respectively and the energizing or actuating or operating of the light members 32 of the circuit boards 30 will not be affected by the others, and no shade is to be moved or actuated or operated by actuators such that the structure of the vehicle head light device in accordance with the present invention may be greatly simplified and may be quickly manufactured and assembled and the manufacturing fee or cost of the vehicle head light device may thus be suitably reduced. As shown in FIGS. 1 and 3, the fins 35 and/or the heat dissipating device 33 that are attached or mounted or secured to the lower casing 23 are located between the air perforations 14 of the outer housing 10 and the passages 38 of the inner housing 20 and/or the openings 42 of the hood 40 for heat dissipating purposes.

Accordingly, the vehicle head light device in accordance with the present invention includes a simplified structure for allowing the vehicle head light device to be easily and quickly manufactured and assembled and for allowing the manufacturing fee or cost of the vehicle head light device to be suitably reduced.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A vehicle head light device comprising:
    an outer housing including a chamber formed therein, said outer housing including at least one air perforation formed therein for air circulating purposes,
    an inner housing attached to said outer housing and including an upper casing and a lower casing located within said chamber of said outer housing, and said upper and said lower casings each including a compartment formed therein and opened forwardly, and each including a reflective member provided therein, said inner housing including at least one passage formed therein and located in front of said at least one air perforation of said outer housing for allowing air to flow into said at least one passage of said inner housing and to flow out through said at least one air perforation of said outer housing,
    a first circuit board and a second circuit board attached to said upper and said lower casings respectively and each including at least one light member directed toward said reflective members of said upper and said lower casings respectively for generating lights toward said reflective members of said upper and said lower casings respectively which reflect the lights to form a high beam and a low beam respectively,
    a first heat dissipating device attached to said lower casing for anchoring and positioning said first circuit board between said first heat dissipating device and said lower casing, said first heat dissipating device including a plurality of fins extended outwardly therefrom and located between said at least one passage of said inner housing and said at least one air perforation of said outer housing for heat dissipating purposes,
    a hood attached to front of said inner housing and said outer housing, and
    a control device disposed within said chamber of said outer housing and electrically coupled to said first and said second circuit boards for controlling said at least one light member to generate the lights toward said reflective members of said upper and said lower casings respectively.

2. The vehicle head light device as claimed in claim 1, wherein said upper casing includes an upper wall having at least one hole formed therein for receiving said at least one light member, and said lower casing includes a lower wall having at least one hole formed therein for receiving said at least one light member.

3. The vehicle head light device as claimed in claim 2, wherein said upper and said lower walls of said upper and said lower casings each include a serrated inner surface formed therein.

4. The vehicle head light device as claimed in claim 1, wherein said hood includes at least one opening formed therein and aligned with said at least one passage of said inner housing for allowing the air to flow through said at least one opening of said hood and said at least one passage of said inner housing and to flow into said outer housing.

5. The vehicle head light device as claimed in claim 4, wherein said hood includes a filter net engaged in said at least one opening of said hood.

6. The vehicle head light device as claimed in claim 1, wherein a second heat dissipating device is attached to said upper casing for anchoring and positioning said second circuit board between said second heat dissipating device and said upper casing.

7. The vehicle head light device as claimed in claim 6, wherein said first and said second heat dissipating devices each include a depression formed therein for receiving said first and said second circuit boards respectively.

8. The vehicle head light device as claimed in claim 6, wherein said second heat dissipating device includes a plurality of fins extended outwardly therefrom for heat dissipating purposes.

9. The vehicle head light device as claimed in claim 1, wherein said outer housing includes a front outer peripheral flange extended radially and inwardly into said chamber of said outer housing, and said inner housing includes a front outer peripheral flange engaged with said outer peripheral flange of said outer housing for securing to said outer peripheral flange of said outer housing.

10. The vehicle head light device as claimed in claim 9, wherein said hood includes an outer peripheral flange engaged with said outer peripheral flange of said inner housing for securing to said outer peripheral flange of said inner housing and said outer peripheral flange of said outer housing.

11. The vehicle head light device as claimed in claim 10, wherein a frame is engaged with said outer peripheral flange of said hood for securing said outer peripheral flange of said hood and said outer peripheral flange of said inner housing to said outer peripheral flange of said outer housing.

* * * * *